United States Patent

Steiger

[15] 3,636,246

[45] Jan. 18, 1972

[54] TELEVISION SIGNAL CONVERSION APPARATUS

[72] Inventor: Werner Steiger, Birmensdorf/Zurich, Switzerland

[73] Assignee: Eidopher, A. G. Glarus, Switzerland

[22] Filed: Nov. 21, 1969

[21] Appl. No.: 878,802

[30] Foreign Application Priority Data

Nov. 26, 1968 Switzerland ......................... 17681/68

[52] U.S. Cl. ...................................... 178/5.4 CR, 178/6.6 A

[51] Int. Cl. ...................................................... H04m 5/78

[58] Field of Search .......................... 178/5.4 CR, 6.6 A, 6 FS

[56] References Cited

UNITED STATES PATENTS 3,157,738 11/1964 Okamura ............................ 178/6.6 A

*Primary Examiner*—Robert L. Griffin
*Assistant Examiner*—Donald E. Stout
*Attorney*—Pierce, Scheffler & Parker

[57] ABSTRACT

A television signal conversion apparatus for converting one type of television signals into another. More specifically an apparatus for sequentially reproducing simultaneous composite color television signals by using a simultaneous-to-sequential signal converter in the form of a magnetic tape recording and reproducing machine. The magnetic tape is guided in a helical path around two coaxially mounted cylinders. The rotatable magnetic heads for recording the incoming television signals on the tape and for reproducing the recorded signals are mounted on a common rotor, which is coaxially disposed inside the cylinders.

9 Claims, 4 Drawing Figures

Inventor
Werner Steiger
By Pierce, Scheffler & Parker
Attorneys

Inventor
Werner Steiger

By Pierce, Scheffler & Parker
Attorneys

Inventor
Werner Steiger

By Pierce, Scheffler & Parker
Attorneys

Inventor
Werner Steiger

By Pierce, Scheffler & Parker
Attorneys

TELEVISION SIGNAL CONVERSION APPARATUS

The invention relates to apparatus for sequentially reproducing simultaneous composite television signals comprising $n$ video, i.e., color component signals by means of a simultaneous-to-sequential signal converter in the form of a magnetic tape machine which, with the aid of a system of magnetic heads, records the incoming television signals including the synchronizing signals on a magnetic tape and reproduces the television signals at $n$ times the recording speed $n$ is equal to the number of color component signals necessary to produce a true color display. For example, in the N.T.S.C. color system, $n$ would be equal to three.

In a known system of this kind the simultaneous composite video television signals are recorded by a rotating triple recording head on a magnetic tape in longitudinally parallel tracks and then reproduced by three movable magnetic heads. This known simultaneous-to-sequential-signal converter has the drawback that owing to the recording and reading heads being independently driven through gearing the picture unavoidably oscillates. Moreover, owing to the longitudinal disposition of the tracks the utilization of the tape is poor and wear of the tape is correspondingly high.

The present invention seeks to eliminate these defects by conducting the magnetic tape helically around two coaxially disposed cylinders having diameters $d$ and D so chosen that their ratio $d$:D is approximately equal to 1:$n$ and by mounting the magnetic heads for recording and reproducing the television signals on a common motor-driven rotor coaxially located inside the cylinders each of which is provided with a peripheral slot through which the heads project into flush surface alignment with the peripheries of the cylinders.

The invention will be hereinafter more particularly described with reference to embodiments illustratively shown in the accompanying drawings in which.

Figure 1:
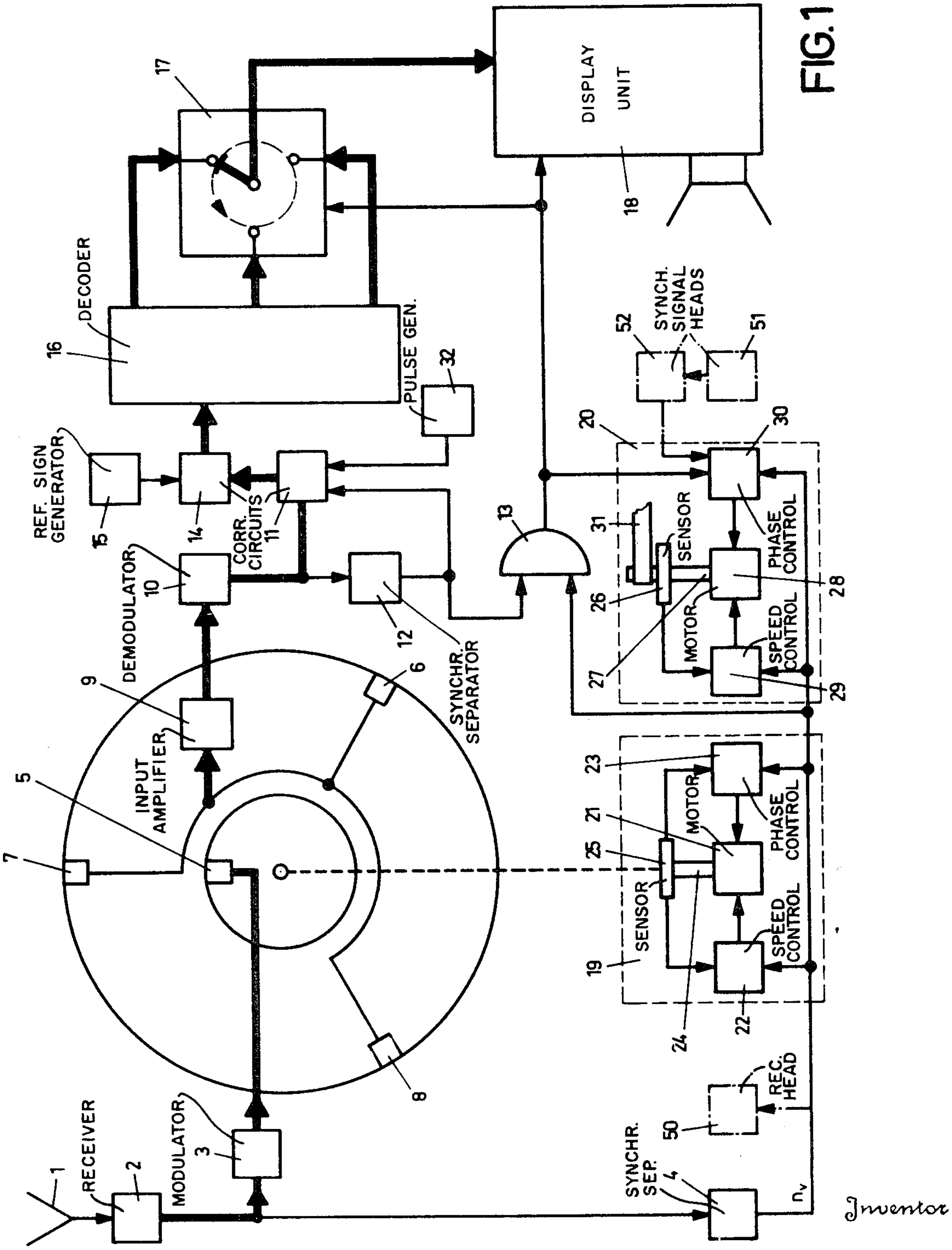
FIG. 1 is a schematic block diagram of apparatus in accordance with the present invention.

Referring to FIG. 1 an aerial is connected to a receiver 2 and the latter to a modulator 3 and a first synchronizing separator 4. The output of the modulator 3 is taken to a recording head 5. The outputs of three reading heads 6, 7 and 8 are connected through an interposed input amplifier 9 to a demodulator 10 and the output of the latter is taken to the input of a correcting circuit 11 and to a second synchronizing separator 12. The connection between the rotatable magnetic heads and the stationary components 3 and 9 can be established by wiper contacts or preferably by rotating transformers. The output of the synchronizing separator 12 is connected firstly to a second input of the correcting circuit 11 and secondly to the input of a gate circuit 13. A second input of the correcting circuit 11 receives reference pulses from a generator 32. The output of the correcting circuit 11 is taken to one input of a second correcting circuit 14 of which the other input is connected to a reference signal generator 15. The output of the correcting circuit 14 is taken to the input of a decoder 16 which has three outputs each leading to one input of, preferably, an electronic switch 17. The output of the switch 17 is connected to one input of a display unit 18. The output of the synchronizing separator 4 is taken on the one hand, to a servo system 19 for driving the magnetic heads (5, 6, 7 and 8) and to a servo system 20 for driving a magnetic tape 31 and, on the other hand, to the second input of the gate 13. The servo system 19 comprises a motor 21, a speed controller 22, a phase controller 23 and a sensor 25 attached to the drive shaft 24 of the motor 21 for sensing the actual speed and phase of the shaft and applying a corresponding signal to an input each of the speed controller 22 and the phase controller 23. The motor 21 is connected to one output each of the speed controller 22 and of the phase controller 23. The servo system 20 contains a sensor 26 on the drive shaft 27 of a motor 28 for sensing its speed and for applying a corresponding signal to an associated speed controller 29. The motor 28 is connected to the associated speed controller 29 and to a phase controller 30. The magnetic tape 31 is merely symbolically represented and in practice runs over the magnetic heads as will be later described. The output of the gate circuit 13 is connected to one input of the phase controller 30, to the switch 17 and to the display unit 18.

The servosystem 19 controls both the speed and the phase position of the driving motor 21. After starting the driving motor, the speed of the motor is first set to the desired constant speed by speed control 22. Subsequently, the desired phase position is set by means of the phase control 23. This setting is effected in such manner that the angular velocity of the driving motor is first briefly increased with a wrong phase position, and subsequently reduced again. In the ideal case, the correct phase position will have been achieved by a single acceleration-and-delaying process. Servo systems of this type are well known and are used in practically all known video recorders.

The manner in which this system functions will now be described with reference to FIG. 1. The composite color television signals are simultaneously delivered by the aerial 1 to the receiver 2 which functions to amplify the signals and to demodulate them. The signals then enter a modulator 3 in which they are frequency modulated and converted into a form suitable for tape recording. The converted simultaneous color television signals are then recorded by the recording head 5 on a magnetic tape machine in a manner that will likewise be later described in greater detail. They are then read three times per frame at three times the recording speed. In principle the read out signals contain the color television signals sequentially and need merely be converted into suitable form for a color television display. For this purpose the signals from the reading heads 6, 7 and 8 are amplified in a preliminary amplifier 9 and applied to a demodulator 10 for limitation and frequency demodulation. With the interposition of correcting circuits 11 and 14 the signals are then sent to the decoder 16 where they are separated into red, green and blue signals. The electronic switch 17 sequentially selects the red, green and blue signals so that in the output of this switch and at the input of the display unit 18 sequential color video signals appear. In the display unit 18, which may a black-and-white modulated oil film type projector, the sequential color signals are used for controlling the display in a manner that is well known in the art, a three-color filter wheel containing red, green and blue filters (not shown) rotating synchronously with the electronic switch 17 between the light source and the projection screen.

The described magnetic tape machine requires the provision of controlled drive means for the magnetic heads and the magnetic tape, electronic changeover and reproduction. For the synchronous control of the switch 17 and of the color filter wheel of the display unit 18 the synchronizing pulses contained in the composite television signal are also recorded by the head 5 on the magnetic tape 31 and read out by the reading heads 6, 7 and 8. After having passed through the demodulator 10 the synchronizing pulses are separated from the video signal by the separator 12 and applied to the gate circuit 13. These synchronizing pulses appear three times in each frame which is composed of the three component frames red, green and blue. The gate circuit 13 passes one of these three synchronizing pulses per frame, for instance that read out by the magnetic head 6. This will hereinafter be referred to as the principal synchronizing pulse. The gate circuit 13 is controlled by the frame synchronizing pulses which have been separated from the television signal by the synchronizing separator 4. The principal synchronizing pulse which therefore appears in the output of the gate circuit 13 is applied to the switch 17 and to the display unit 18 for controlling their phase positions.

For driving the magnetic heads in synchronism with the picture the speed and phase of the motor 21 are also controlled by reference to the frame synchronizing pulses in the television signal. The sensor 25 supplies the speed controller 22 and the phase controller 23 with signals representing the actual speed and phase. By comparison with the synchronizing pulses obtained from the synchronizing separator 4 the motor 21 is controlled to maintain the desired constant phase position and speed.

The servo system 20 for driving the magnetic tape controls the speed of the tape in such a way that when a frame-synchronising pulse appears in the television signal, and hence when the recording head 5 begins to record, the beginning of a trace and hence a principal synchronizing pulse will be present at the reading head 6. The speed controller 29 compares the signals representing actual speed received from the sensor 26 with the frame-synchronising pulses received from the synchronizing separator and roughly adjusts the speed of the motor 28 and hence the speed of transportation of the tape. The phase controller 30 provides precise regulation of the transporting speed by comparing the phase of the principal synchronizing pulses obtained from the gate circuit 13 with that of the frame-synchronising pulses received from the separator 4.

Since the drive means of the magnetic heads and of the tape are controlled by the synchronizing pulses of the television signals, the described arrangement is independent of the frame sequence frequency, i.e., it is independent of standards.

After leaving the demodulator 10 the read out television signals are passed through correcting circuits 11 and 14 for eliminating phase errors. These correcting circuits have the form of controlled variable delay lines. In the correcting circuit 11 the phase of the synchronizing pulses that have been separated from the television signal by the synchronizing separator 12 is compared with that of reference signals generated in a reference pulse generator 32. Error signals resulting from this comparison control the delay of the television signals. Analogously any phase error that may still be present is corrected by variable delay in the correcting circuit 14, but the error signal in this case is obtained by comparing the phase reference signal i.e., a color burst which is contained in the television signal and which is read out by the reading head, with a reference signal obtained from a quartz-controlled reference oscillator 15.

Figure 2:
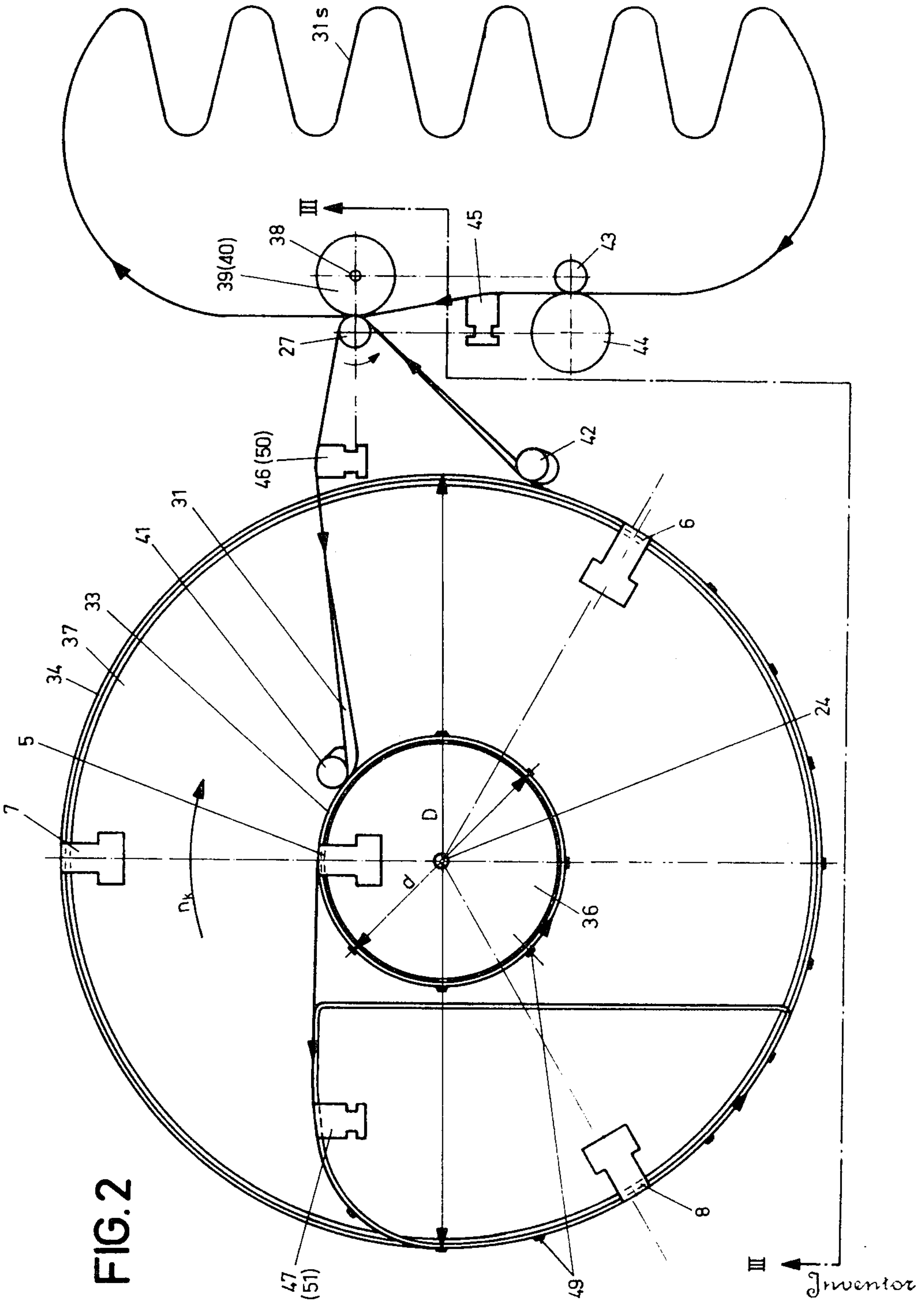
FIG. 2 is a plan view of the magnetic tape machine forming part of the apparatus illustrated in FIG. 1.
Figure 3:
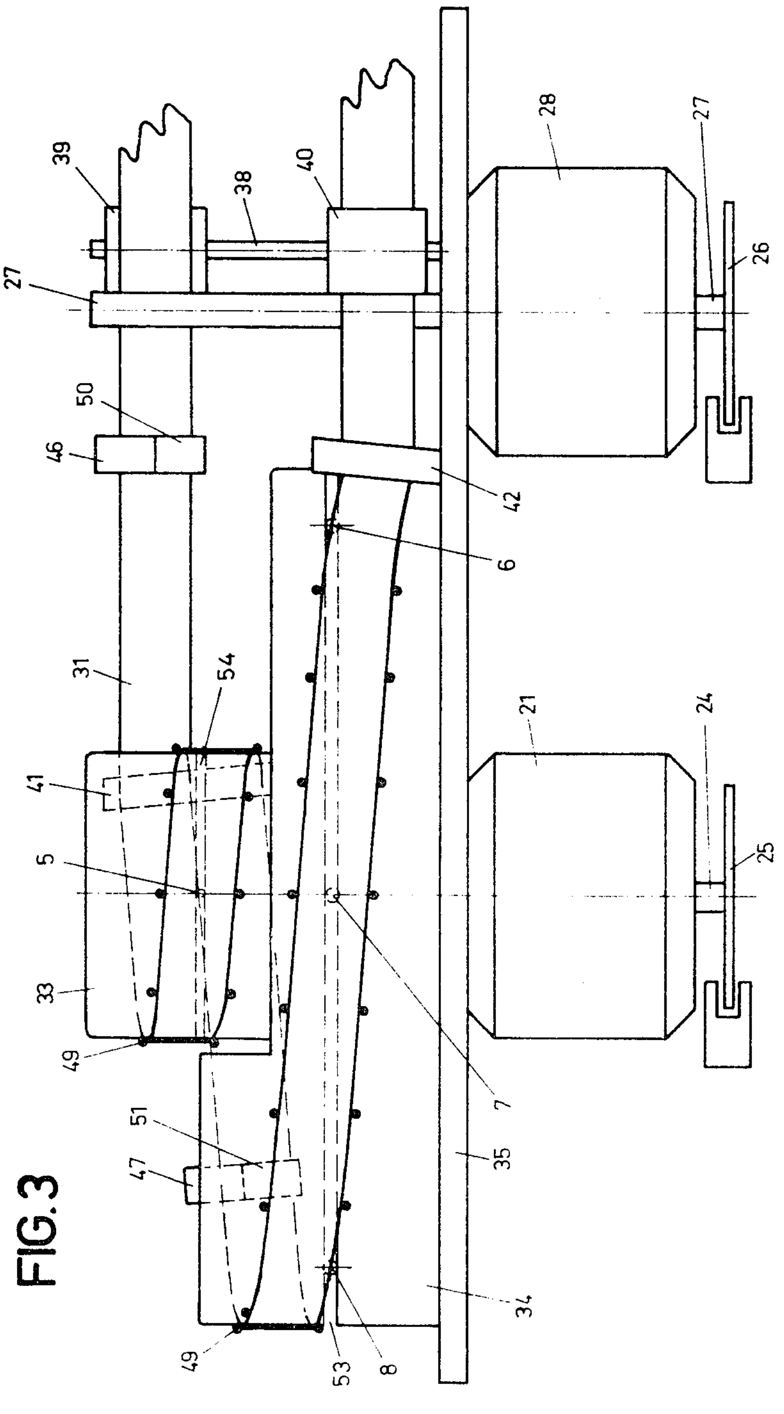
FIG. 3 is a side elevation on the line III—III in FIG. 2.

As shown in FIGS. 2 and 3 the upper face of a baseplate 35 carries two coaxial cylinders, the one above the other, of which the cylinder 33 has a diameter *d* and the cylinder 34 a diameter D, the ratio of *d*:D being roughly 1/*n*. Below the baseplate 35 is the driving motor 21 located with its drive shaft 24 extending coaxially upwards into the two cylinders 33 and 34 for imparting rotation to two circular discs 36 and 37. The disc 36 carries the recording head 5 whereas the disc 37 carries the reading heads 6, 7 and 8 roughly at 120° angular intervals. The magnetic heads 5 to 8 project through continuous peripheral slots 53 and 54 to the surface of the magnetic tape. At the bottom end of the drive shaft 24 is the sensor 25. The motor 28 is also affixed to the underside of the baseplate 35, its drive shaft 27 projecting upwards and carrying the sensor 26 at its bottom end. A shaft 38 rotatably journaled in the baseplate 35 carries two pressure rollers 39 and 40. Likewise mounted on the baseplate is a slanting deflecting post 42, a pressure roller 44 cooperating with a braking roller 43, an erasing head 45, an audio recording head 46 and an audio replay head 47. The stationary cylinder 34 carries another slanting deflecting post 41. The path of the magnetic tape 31 which is indicated by arrows runs from tape storage loops 31*s* between the braking roller 43 and pressure roller 44 past the erasing head 45 to the drive shaft 27 and thence over the sound recording head 46 and around the deflecting post 41 to the cylinder 33. Owing to the obliquity of the post 41 and the presence of peripheral locating studs 49 on both cylinders 33 and 34 the tape envelopes the cylinder 33 in the form of a helix, leaving the same, after completing one turn, in a position downwardly displaced by the width of the tape (say 1 inch). After passing over the audio playback head 47 the tape runs onto the cylinder 34. The tape 31 envelops this cylinder

34, likewise helically, and leaves the same, after having run around at least one third of its periphery, at the deflector post 42 whence it returns to the drive shaft 27, downwardly displaced by about twice the width of the tape. After having passed between the drive shaft 27 and the pressure roller 30 the tape 31 runs back to the storage loops 31*s*. Instead of enveloping the cylinders as described in so-called "alpha loops" the tape could also be appropriately guided to envelop the cylinders in so-called "omega loops." In the industry, an "alpha" loop is known as one wherein the tape loops the drum over its entire circumference; in an "omega" loop the tape loops the drum over only a portion of the complete circumference.

Before the tape drive is started the magnetic tape 31 envelopes the two cylinders 33 and 34 rather loosely. However, as soon as the driving motor 28 starts up, the tape is transported by the drive shaft 27 and the pressure roller 39 towards the cylinders and by the pressure roller 40 away from the cylinders. The effect of the braking roller 43 is that withdrawal of the tape from the cylinders is more rapid than its delivery to the cylinders due to slippage on shaft 27 so that the tape will quickly pull taut. When this is the case further transportation of the tape is effected at the constant speed controlled by the above-described servo system 20. In practice the speed of transportation may be for instance 7.5 or 15 inches/second. The storage loops of tape are provided for the purpose of prolonging the life of the tape. The length of the tape which will depend upon different degrees of wear experienced in practice should at least 10 meters but preferably 100 meters.

The recording head 5 and the three reading heads 6, 7 and 8 are rotated at a constant speed $n_K$ by the motor 21 and the servo system 19. The controlled speed $n_K$ equals the frame repetition frequency $n_v$ of the television signal. The diameter D of the cylinder 34 in relation to the diameter *d* of the cylinder 33 is so determined that the speed of the reading heads 6, 7 and 8 in relation to the magnetic tape 31 is three times the speed of the recording head 5 in relation to the magnetic tape 31. A trace magnetically recorded by the recording head 5 on the magnetic tape 31 will therefore be read by each of the three reading heads 6, 7 and 8 in one third of the recording time. In other words, during the time it takes the recording head 5 to record a trace the reading heads 6, 7 and 8 will read a previously recorded trace consecutively three times. Since the magnetic tape travels during the reading out process, the reading heads are not exactly located at 120° intervals but at slightly greater or smaller angular intervals according to the direction of travel of the tape. If, as is the case in FIG. 2, the direction of transportation of the tape is contrary to the direction of rotation of the magnetic heads, so that the relative speed between the heads and the tape exceeds the peripheral speed of the heads, then the angles between two of the three reading heads must exceed 120°. Conversely, if the tape and the magnetic heads travel in the same direction then these angles must be less than 120°. Moreover, the ratio of the diameters *d*:D of the two cylinders 33 and 34 depends on whether the tape and the magnetic heads move in the same direction or in opposite directions and it also depends, though to a smaller extent, upon the speed of the tape. If the tape travels in the direction indicated in FIG. 2, *d*:D must be slightly less than 1:3. The helical path of the magnetic tape 31 displaces the tape elevationally during the reading out time by one of the reading heads (say 6). The next reading head (say 7) would not therefore run onto the same magnetic trace in the same plane normal to the axis. This displacement is corrected by slightly offsetting the three reading heads 6, 7 and 8 on the disc 37.

Since the number of revolutions per second of the magnetic heads ($n_K$) is numerically equal to the frame repetition frequency $n_v$ (say 50/sec) the recording head 5 will produce on the tape in the course of one revolution of the disc 36 a trace containing all the signals, i.e., *n* component signals that are associated with one frame. After a period of delay which in FIG. 2 equals the time it takes the tape to travel from the recording head 5 to the reading head 6, the reading head 6 will read all the signals associated with this frame in a third of the time it has taken to record them. The next reading head 7 will then read the same signals and the reading head 8 will read them again. Assuming a diameter $d$ of the cylinder 33 of 10 cm., a diameter D of cylinder 34 of about 30 cm. and a speed of the tape of 7.5 inches/second, the delay will be about 3 seconds. The manner in which the read delayed signals are then further processed has already been described.

The audio signals which are associated with the video signals must naturally be reproduced with he same amount of delay. For this purpose the audio signals are recorded by the fixed audio recording head 46 on the margin of the tape and then read by the likewise fixed audio reading head 47. The distance between the two audio heads is so chosen that the delay between recording and reading is again equal to the time the tape takes to travel from the recording head 5 to the reading head 6, that is to say 3 seconds.

It has already been explained that for the fine regulation of the speed of the tape the frame synchronizing pulses are compared with the principal synchronizing pulses and that the rotating magnetic heads can be used for recording and reading them. Since these synchronizing pulses have a much lower frequency than the video signals they may also be recorded and read by fixed magnetic heads. An arrangement for processing the signals in this variant of the invention is indicated in FIG. 1 in discontinuous lines. The output of the synchronizing separator 4 is connected to a stationary head 50 for recording the synchronizing pulses. Instead of feeding the principal synchronizing pulses from the gate circuit 13 to the phase controller 30, the synchronizing pulses read by a stationary synchronizing signal reading head 51 are passed through an input amplifier 52 and fed to the phase controller 30. Since with reference to the spacing of the two synchronizing signal heads 50 and 51 the same considerations apply as to the audio heads, the synchronizing signal heads are located for structural reasons directly below the audio heads (FIGS. 2 and 3).

The embodiment that has been described with reference to FIGS. 1 to 3 presupposes that the video color signals are recorded in coded form, i.e., in the same way as in a transmission from a transmitting to a receiving station. An embodiment will now be described with reference to FIG. 4 in which recording in coded form is unnecessary.

Figure 4:
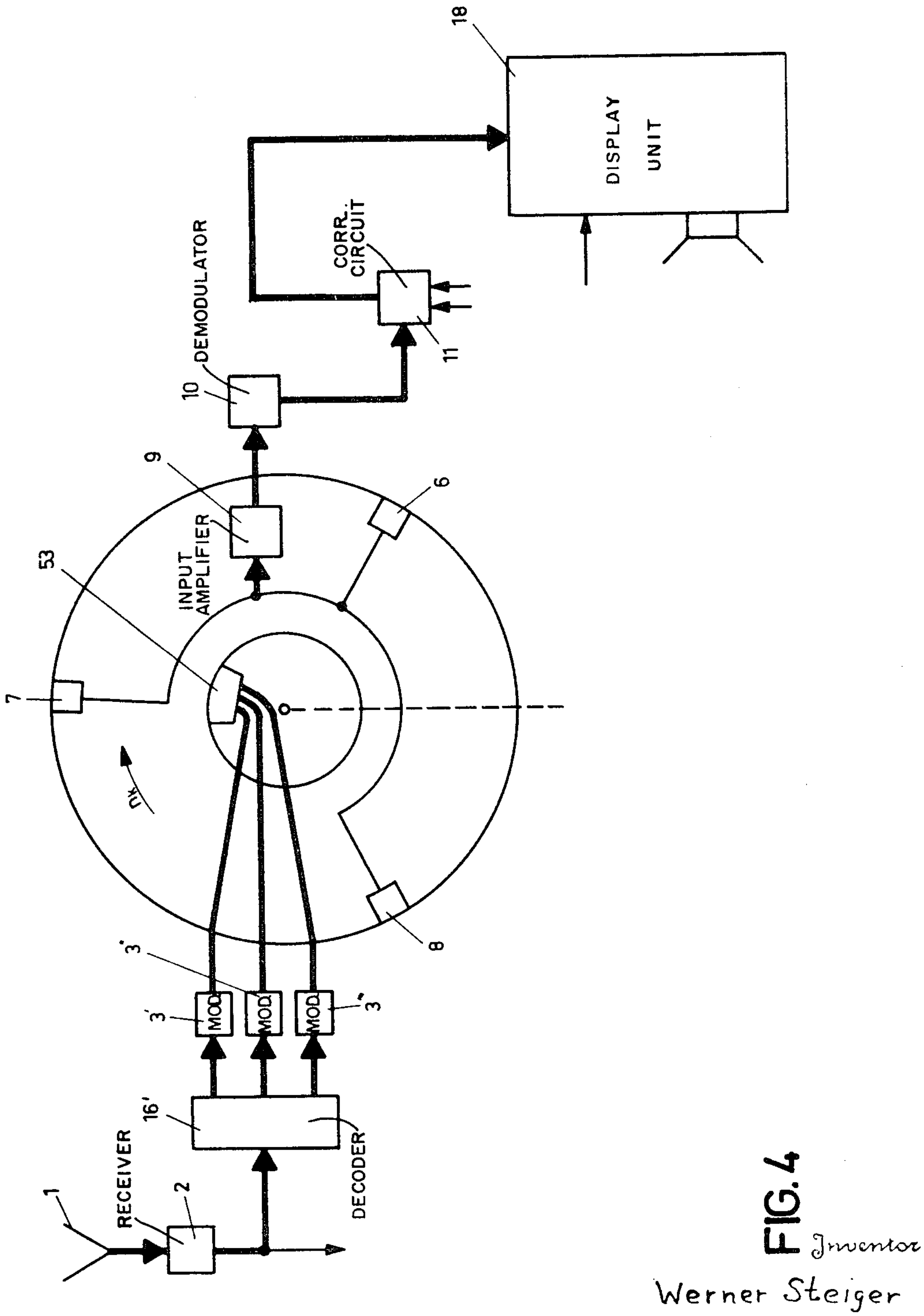
FIG. 4 is an alternative form of magnetic recording and reproducing apparatus to that shown in FIG. 1.

Referring to FIG. 4 the receiver 2 is connected to a decoding circuit 16′ which has three outputs each connected to the input of one of three modulators 3′, 3″, 3‴. Each modulator is connected to one part of a triple recording head 53. The three reading heads 6, 7 and 8 are connected through an interposed input amplifier 9 to a demodulator 10 which delivers its output through a correcting circuit 11 to the display unit 18. The coded color signals that are amplified in the receiver 2 are decoded in the decoder 16′, i.e., divided into separate signals in respect of each color channel (blue, green and red). In the modulator 3′, 3″, 3‴ associated with each color channel the video signals are converted by frequency modulation into suitable form for tape recording. The triple recording head 53 simultaneously records the signals of the three color channels on the magnetic tape in the form of three separate traces which for reasons of space need not necessarily be side by side. The reading heads 6, 7 and 8 each consecutively read a trace at three times the recording speed. This already produces sequential color video signals. These signals are amplified (9) and limited and demodulated in the demodulator 10. They then preferably pass through an electronic correcting delay line (11) and finally enter the display unit 18 which may again be a black-and-white projection unit equipped with a rotating three-color filter. The circuit arrangements for the controlled drive of the magnetic heads, for the drive of the magnetic tape and the rotating three-color filter in the display unit are not shown in FIG. 4. However, they are identical with the corresponding arrangements illustrated in FIG. 1.

This embodiment comprising a triple recording head can also be operated in reverse and simultaneous composite signals can be constituted from sequential television signals. In such a case the sequential signals are recorded by the three reading heads 6, 7 and 8 and read by the triple recording head 52.

It will be readily understood that it is also within the scope of the present invention to abstract two, four or more ($n$) sequential signals within the period of one frame. According to the number ($n$) of abstracted signals required the reading heads must merely read the recorded signals at $n$ times the recording speed. Since according to the underlying principle of the invention the magnetic tape recording unit contains no gearing, the two discs which carry the recording and reading heads are both mounted on the drive shaft of one motor and they therefore perform the same number of revolutions per second. In order to provide a reading speed of $n$ times the recording speed, the ratio of the diameters $d$:D of the two cylinders must be approximately equal to 1:$n$.

The terms frame and frame repetition frequency as used in the preceding description is intended to include half-frame and half-frame repetition frequency.

I claim:

1. Color television recording and reproducing apparatus comprising:

means receiving composite television signals having $n$ video component signals;

a rotatable shaft;

magnetic recording means;

means applying said $n$ video signal components to said magnetic recording means;

means mounting said magnetic recording means on said shaft for rotation therewith;

a plurality of magnetic reproducing heads;

means mounting said magnetic reproducing heads for rotation with the shaft at a position thereon spaced apart from said magnetic recording means, said magnetic reproducing heads being angularly disposed about said shaft by approximately $2\pi/n$;

a first cylinder having a periphery defining a slot through which said magnetic recording means project flush with the surface of said periphery;

a second cylinder coaxially aligned with said first cylinder and having a periphery defining a slot through which said magnetic reproducing heads project flush with the surface of said periphery, said first and second cylinders having respective diameters $d$ and D chosen so that the ratio $d$:D is approximately equal to 1:$n$; and guide means on said first and second cylinders arranged to guide magnetic tape in a helical path about said first and second cylinders such that the tape is guided about substantially the entire periphery of said cylinder having the smaller diameter and over at least $1/n$ of the periphery having the larger diameter whereby the signals recorded by said magnetic recording means on passage of the tape over said first cylinder are reproduced $n$ times by said reproducing heads on passage of the tape over said second cylinder.

2. Apparatus according to claim 1, wherein the mounting means for the magnetic recording means and the magnetic reproducing heads comprises circular discs.

3. Apparatus according to claim 1 including servo-controlled drive means driving said tape over said cylinders, a fixed magnetic recording head recording on said tape-synchronizing signals derived from the received television signals prior to the passage of the tape over the cylinder of smaller diameter, and a fixed magnetic reproducing head reproducing the recorded synchronizing signals after the tape leaves the cylinder of smaller diameter, said servo controlled drive means being responsive to the synchronizing signals reproduced by said fixed magnetic reproducing head so that during the recording of a synchronizing signal by said fixed magnetic recording head a previously recorded synchronizing signal is reproduced by said fixed magnetic reproducing head.

4. Apparatus according to claim 1, wherein said magnetic recording means comprises magnetic recording heads, each recording head for recording a signal containing more than one component in a track on the magnetic tape being associated with at least one reproducing head which reproduced from the track in consecutive time intervals as many times as the number of components in the recorded signal.

5. Apparatus according to claim 4, wherein the number of reproducing heads associated with each track equals the number of components in the recorded signal, each of the reproducing heads reproducing the recorded signal in the track at least once before it is reproduced by the following reproducing head.

6. Apparatus according to claim 1 for sequentially reproducing simultaneous color television signals comprising $n$ color component signals per frame, including a color component decoding unit responsive to the signals reproduced by said magnetic reproducing heads to provide a plurality of output signals each containing information of a different one of the colors included in said television signal, a display unit having a light source, a rotatable filter having filter elements corresponding to the colors in said television signal and arranged in front of said light source, an electronic switch coupling the output signals from said decoder to said display unit, and drive means for rotating said rotatable filter wherein said light source is responsive to signals received by the display unit to produce a visual image in accordance with the information contained in the received signal and wherein said drive means and said electronic switch are responsive to synchronizing signals included in said television signal as received by said receiving means to couple an output signal from the decoder to the display unit and position in front of said light source a filter element having a color corresponding to the color represented by the output signal switched to the display unit.

7. Apparatus according to claim 1, wherein said receiving means includes a decoder dividing the received television signals up into separate signals each containing information of a different one of the components included in said television signal and applying the separated signals to individual ones of said plurality of magnetic recording heads, said apparatus further including a display unit reconstituting the separated component signals reproduced by the magnetic reproducing heads into a composite signal display.

8. Apparatus according to claim 7 for sequentially reproducing simultaneous color television signals comprising $n$ color component signals per frame, wherein said display unit includes a light source responsive to the signals successively reproduced by said magnetic reproducing heads to produce a visual image in accordance with the information contained in the received signal, a rotatable filter having filter elements corresponding to the colors in the received television signal, means responsive to frame-synchronizing signals in the received television signal to rotate said filter and positioned successively in front of the light source filter elements corresponding in color to the color information contained in the successively reproduced signals as applied from the magnetic reproducing heads to the display unit.

9. Apparatus as claimed in claim 1, including a motor driving said shaft, means for sensing the speed of rotation of said shaft and the position thereof, and means responsive to frame-synchronizing signals included in the received television signal and the sensing means to control the speed of rotation of the motor and the position of said shaft.

* * * * *

PO-1050
(5/69)

UNITED STATES PATENT OFFICE
CERTIFICATE OF CORRECTION

Patent No. 3,636,246 Dated January 18, 1972

Inventor(s) WERNER STEIGER

It is certified that error appears in the above-identified patent and that said Letters Patent are hereby corrected as shown below:

Claim 4, line 5, "reproduced" should be
-- reproduces --

Claim 7, last line, "signal" should be
-- visual --.

Claim 8, lines 10 and 11, "positioned successively"
should be -- successively positioned --

Signed and sealed this 6th day of June 1972.

(SEAL)
Attest:

EDWARD M.FLETCHER,JR.
Attesting Officer

ROBERT GOTTSCHALK
Commissioner of Patents